C. E. FISCHER.
PLANTER.
APPLICATION FILED APR. 13, 1914.
1,291,818.
Patented Jan. 21, 1919.
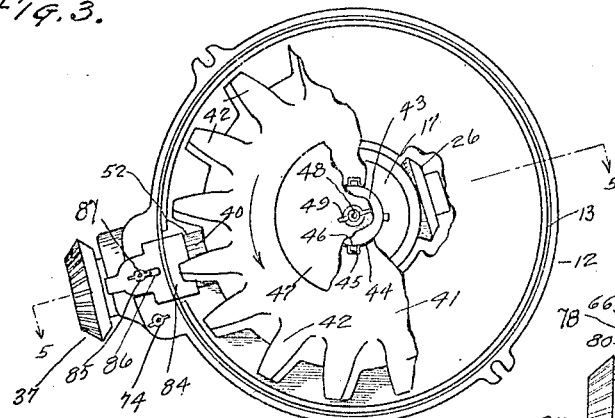
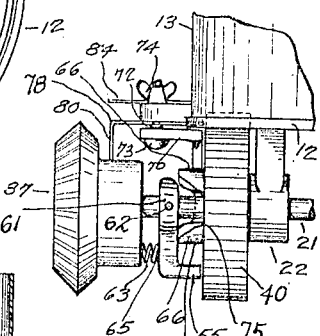
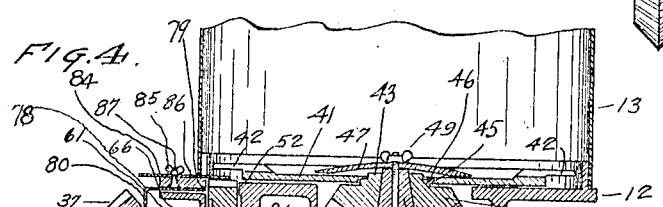
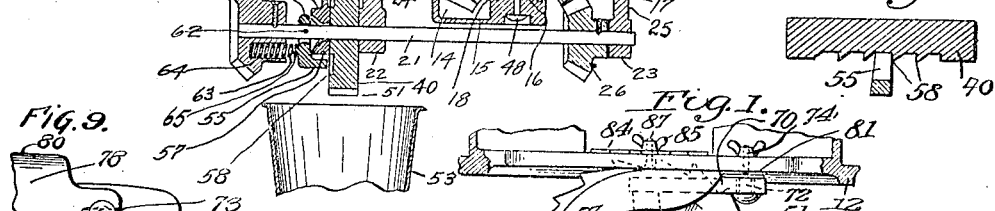
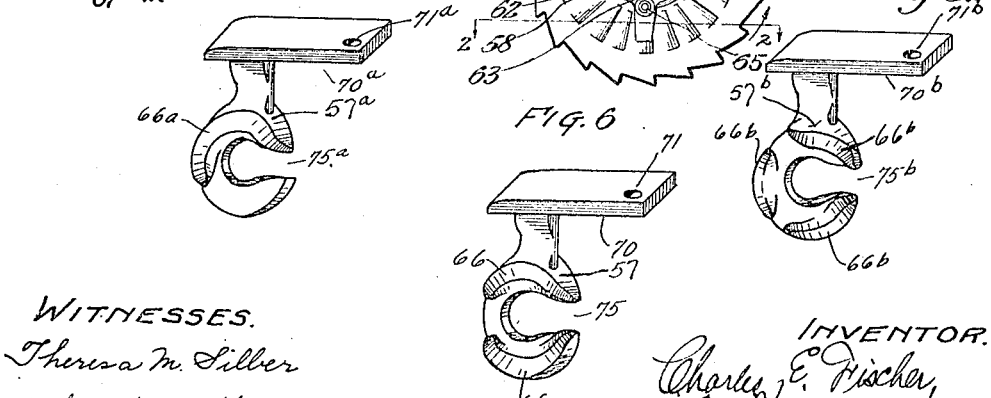
WITNESSES.
Theresa M. Silber
John A. Hollander
INVENTOR.
Charles E. Fischer,
by H. F. Herbsleb,
His Attorney.

UNITED STATES PATENT OFFICE.

CHARLES E. FISCHER, OF WEST HARRISON, INDIANA, ASSIGNOR TO THE CAMPBELL BROS. MANUFACTURING COMPANY, OF HARRISON, OHIO, A CORPORATION OF OHIO.

PLANTER.

1,291,818.

Specification of Letters Patent.

Patented Jan. 21, 1919.

Application filed April 13, 1914. Serial No. 831,562.

*To all whom it may concern:*

Be it known that I, CHARLES E. FISCHER, a citizen of the United States, residing at West Harrison, in the county of Dearborn and State of Indiana, have invented certain new and useful Improvements in Planters, of which the following is a specification.

My invention relates to planters and is especially adapted to cotton-seed planters or to combined cotton and other seed planters. Cotton-seed as is well-known is covered with lint which has a tendency to bunch the seeds.

In planting cotton-seed it is desirable to plant a number of cotton-seed in close proximity to each other, so that the combined efforts of the germinating seeds thus planted in close proximity may readily raise the ground above them to permit the sprouts to appear.

The surplus sprouts are then weeded out, permitting the selected sprouts to remain for forming the plants.

It is the object of my invention to provide novel means whereby economy in seed-planting is obtained by planting the seeds only at the points it is desired to have the bearing plants located, and to preferably plant the seeds in interrupted stream-like arrangement.

The invention will be further readily understood from the following description and claims, and from the drawings, in which latter:

Figure 1 is a side elevation of the operating means for the picker-wheel, the hopper being partly broken away.

Fig. 2 is a cross-sectional detail of the same on the line 2—2 of Fig. 1, but showing the finger in engagement with the seed-feeding teeth.

Fig. 3 is a plan view of the hopper and the mechanism in connection with the same, partly broken away.

Fig. 4 is a vertical section of the same on the line 4—4 of Fig. 3.

Fig. 5 is an enlarged edge elevation of the picker-wheel and its driving means;

Figs. 6, 7 and 8 are perspective views showing cam-parts having differently arranged cams thereon for controlling said driving means.

Fig. 9 is a bottom view detail showing the means for detachably securing the shield in place.

My invention is adapted to be used in connection with machines of the general type of cotton-seed planters or combined cotton-seed and grain planters, and in the present exemplification I have shown the same as applied in a so-called walking planter, although the same may also be employed in riding planters and other relations in which it is desired to plant cotton-seed.

A plate 12 constitutes the bottom wall of the hopper 13 and is arranged to be suitably rigidly supported on the frame of the machine.

The plate is provided with a depression 14, the bottom 15 of which has an upwardly extending boss 16, about which a bevel-gear 17 is arranged to rotate, the bevel-gear being supported on the annular ridge 18 of the boss.

21 is a drive-shaft, journaled in bearings 22, 23, in lugs 24, 25, depending from the plate. This drive-shaft has a bevel-gear 26 secured thereto, which meshes with the bevel-gear 17.

The drive-shaft has a bevel-gear 37 fixed thereon. Suitable means may be provided for driving this bevel-gear, for instance, from the usual traction-wheel of a so-called walking planter.

A rotatable member 40 is provided which is arranged to have intermittent rotary motion imparted thereto in the direction of the arrow $a$ in Fig. 1.

A plate 41 is provided in the bottom of the hopper and has fingers 42 projecting outwardly from its periphery, forming a finger-plate. The finger-plate is arranged to rotate in the bottom of the hopper, as by being received about the hub 43 of the gear 17. This hub is received through the central opening 44 in the finger-plate, the wall of this opening being provided with recesses 45 in which lugs 46 on the bevel-gear 17 are received. A cover-plate 47 is received over the drive-connection between said hub and the finger-plate. A bolt 48 extends through the boss 16 and has a nut 49 at its top for clamping the cover-plate to the boss and permitting free rotation of the gear 17 and the finger-plate. Continuous rotation is thereby imparted to the finger-plate in the bottom of the hopper for continuously feeding the cotton-seed to the seed feeding means.

The rotatable member is provided with peripheral seed-feeding teeth 51, thereby serving as a picker-wheel arranged to be received in a slot 52 in the bottom wall of the hopper. The slot forms a seed-opening. These teeth coact with the slot to feed the cotton-seed out of the hopper. The rotatable member wheel extends from the bottom wall of the hopper, and is shown at substantial right angles to said wall. Rotation is imparted to the rotatable member so that the teeth 51 thereof will engage the cotton-seed agitated in the hopper thereabove by the finger-plate for feeding the same into the seed-spout 53 upon rotation of the rotatable member.

I have shown this rotatable member mounted so that the drive-shaft 21 may rotate loosely within the same, the rotatable member being loosely received journalwise about the drive-shaft.

Means are provided for intermittently moving the seed-feeding teeth, shown accomplished by a normally rotatable element and a normally stationary element having coacting relation with each other, and a controlling element for controlling said coaction. In the present exemplification the normally rotatable element is exemplified as a finger 55, and the normally stationary element as the rotatable member 40, with which said finger coacts, to intermittently rotate the same, the controlling element being shown as a cam-part 57.

The rotatable member 40 is provided with driving teeth 58, thereby forming a driving wheel. The teeth 51 and the teeth 58 are arranged to rotate simultaneously, and with their supporting means form a driving wheel and a seed-feeding wheel, the drawings showing these wheels as an integral structure. The finger 55 is adapted to coact with said teeth 58 by selectively engaging said teeth, whereby to rotate the rotatable member 40 and the seed-feeding teeth 51. The engaged relation between said finger and the teeth 58, for feeding movement of the seed-feeding teeth, is shown in Fig. 2. The disengaged relation of said finger, caused by the cam-part 57, is shown in Figs. 4 and 5. The means for disengaging the finger and for causing cessation of feeding movement of the seed-feeding teeth will now be described.

The finger in the present exemplification is mounted to rotate with the drive-shaft 21, being provided with a yoke 61 pivoted by a pin 62 to the drive-shaft. The finger is urged toward the teeth 58 by a spring 63 which for convenience is received in a socket 64 in the hub of the driving bevel-gear 37, hereinbefore referred to, the inner end of the spring being received about a lug 65 on the finger. This, in the present exemplification, forms the resilient coacting connection between the rotatable member and its driving means, and prevents a breaking of parts in case the rotatable member should be so placed that the finger would for instance contact the apex of one of the teeth 58 instead of being received in the depression between said teeth.

Release of coacting relation between the finger and the teeth 58 of the rotatable member 40, in the present exemplification, is shown accomplished by the cam-part 57. One or more cams 66 are formed on the cam-part for controlling the frequency of such releases. The cams are arranged to cause disengagement between the finger and the driving teeth 58 of the rotatable member, the spring 63 normally urging engagement between said finger and said teeth. Such engagement takes place during the times that the finger is not moved away from said driving teeth by the cam or cams which may be employed. The sizes of the cams are also so selectively arranged as to control the durations of co-action between the finger and the driving teeth, whereby the cotton-seed is intermittently fed streamlike by the seed-feeding teeth during selective intervals.

The cam-part shown in Fig. 6 is provided with two cams 66, the cam-part shown in Fig. 7 is provided with one cam, indicated by the same reference numeral with the exponent $a$, and the cam-part shown in Fig. 8 is provided with three cams, indicated by the same reference numerals with the exponent $b$. The parts in Figs. 7 and 8 similar to the parts in Fig. 6 are designated by the same reference numerals with the exponent $a$ in Fig. 7, and the exponent $b$ in Fig. 8. These cam-parts are arranged to be selectively placed in the machine for controlling the duration of the feeding of the stream of cotton-seed and also for controlling the number of actuations of the picker-wheel with relation to the revolutions of the drive-shaft.

I have also arranged the parts so that, when there is release of coaction between the finger and the teeth 58, the rotatable member will be held in place to prevent its rotation, which is accomplished by loosely mounting the cam-part employed, for instance, by providing it with an arm 70 having a hole 71 in which the shoulder-portion 72 of a shoulder-bolt 73 is loosely received, the shoulder-bolt being arranged to be clamped in place, as to the bottom-plate by the nut 74. The cam-part being loosely mounted is allowed to have slight movement in the direction of the axis of rotation of the shaft 21.

When now the member on which the finger 55 is located, for convenience called the finger-member, rides upon a cam, the finger 55 is disengaged from the teeth 58, as shown in Figs. 4 and 5, and the spring 63 urges the finger-member toward the cam-part, a cam on which is engaged by the finger-member, the cam-part being in turn urged toward the rotatable member 40, and the rotatable member being urged toward the bearing 22, whereby friction or braking action is exerted between the rotatable member and said cam-part and bearing, for holding or braking the rotatable member and preventing its rotation during intended positions of rest of the seed-feeding teeth.

The cam-parts in the present exemplification are interchangeable, and are readily attached and detached. They are shown as provided with an open-ended slot 75 arranged to be received about the drive-shaft and to be held loosely in place by the shoulder-bolt, and are so hung that their cams will be in proper relation with the drive-shaft and shank of the finger.

In order to protect the driving connections between the drive-shaft and rotatable member 40 from the dirt and lint of the cotton-seed, when arranged as exemplified, a shield 78 is provided, whose inner edge 79 is located closely adjacent to the outer face of the rotatable member, the shield extending rearwardly above said driving connections and having a downwardly extending flange 80 above the hub of the bevel-gear 37. The shield has a lateral extension 81 provided with a slot 82 through which the shank of the shoulder-bolt 73 extends, the shoulder of said shoulder-bolt clamping said extension to the bottom-plate of the hopper. When the nut 74 is released, the shield is unclamped and may be removed endwise for exposing said driving connections, the removal of said bolt permitting ready removal of the cam-part secured thereby for substitution of another of said cam-parts. The parts mentioned are readily accessible from the outside of the hopper.

A regulating plate 84 is provided for regulating the flow of seed. This plate is arranged to regulate the width of the slot 52, which forms a seed opening. The plate is arranged to be clamped in selective positions by means of a nut 85, the plate being provided with a slot 86 through which the bolt 87 for the nut is received.

If it is desired to employ the device for planting other than cotton-seed, the finger-plate is removed, and a suitable other seed-plate having seed-holes, as is well known in the art, substituted therefor, the seed-holes being arranged to register with a usual coacting seed-dropping hole in the bottom wall of the hopper, for dropping the seed into the seed-spout, the seed-plate having driving connection with the gear 17 similar to the driving connection between said gear and the finger-plate.

If desired, the cam-part may be removed without substitution, in which relation the parts will act to continuously feed the cotton-seed by means of the seed-feeding teeth.

Having thus fully described my invention, what I claim as new and desire to secure by Letters Patent, is:

1. In a planter of the character described, the combination of a seed-hopper provided with a seed-opening, rotatable means provided with seed-feeding teeth coacting with said opening for picking the seed out of said hopper through said opening, a drive-shaft, driving connection between said drive-shaft and said rotatable means comprising a resiliently yielding member, and means for causing intermittent movements of said resiliently yielding member causing intermittent interruptions in said driving connection and braking action to brake said rotatable means during said intermittent interruptions.

2. In a planter of the character described, the combination of a seed-hopper provided with a seed-opening, rotatable means provided with seed-feeding teeth coacting with said opening for picking the seed out of said hopper through said opening, a finger-plate in the lower end of said hopper provided with fingers for directing the seed in said hopper toward said opening and said seed-feeding teeth, a drive-shaft, means between said drive-shaft and finger-plate for continuously rotating said finger-plate, a driving connection between said drive-shaft and said rotatable means comprising a resiliently yielding member, means for causing intermittent releasing movements of said resiliently yielding member to cause intermittent interruptions in said last-named driving connection and constructed and arranged to cause braking action on said rotatable means during said releasing movements.

3. In a planter of the character described, the combination of a seed-hopper provided with a seed-opening, rotatable means provided with seed-feeding teeth coacting with said seed-opening, and means for causing intermittent rotation of said rotatable means comprising a connecting means for driving said rotatable means, resilient means acting on said connecting means, and a cam for controlling said connecting means, said cam acted on by said resilient means for braking said rotatable means.

4. In a planter of the character described, the combination of a seed-hopper provided with a seed-opening, a shaft, rotatable means provided with seed-feeding teeth loose on said shaft coacting with said seed-opening, and means causing intermittent connection of said rotatable means with said shaft comprising a connecting means for driving said rotatable means, resilient means acting on said connecting means, and a removable cam-part provided with cam means for releasing said connecting means, said cam-part provided with a peripheral slot extending past the axis of said cam-part for releasable reception of said cam-part about said shaft.

5. In a planter of the character described, the combination of a seed-hopper provided with a seed-opening, rotatable means provided with seed-feeding teeth coacting with said seed-opening, and means for causing intermittent rotation of said rotatable means comprising connecting means and resilient means acting thereon for driving said rotatable means, and cam means acting to release said connecting means and to brake said rotatable means.

6. In a planter of the character described, the combination of a seed-hopper provided with a seed-opening, seed-feeding teeth coacting with said opening for picking the seed out of said hopper through said opening, and means for intermittently moving said seed-feeding teeth comprising a toothed wheel, a finger coacting therewith, means comprising a loosely mounted cam-part for causing intermittent coacting relations and releases thereof between said toothed wheel and finger, and resilient means acting to cause frictional resistance between said cam-part and toothed wheel during said releases.

7. In a planter of the character described, the combination of a seed-hopper provided with a seed-opening, a normally rotating element, an intermittently rotating element with which last-named element coacts for causing rotation of the latter, resilient means normally urging coacting relation between said elements, seed-feeding teeth actuated by said last-named rotation and coacting with said seed-opening for picking seed out of said hopper through said opening, and a cam-part operatively interposed between said elements and acted on by said resilient means for pressing said cam-part toward said intermittently rotating element during positions of rest of the latter.

8. In a planter of the character described, the combination with a seed-hopper provided with a seed-opening, of seed-feeding means comprising a drive-shaft, a bearing therefor, a finger normally rotating with said drive-shaft, an intermittently rotatable part located loosely about said drive-shaft, resilient means for urging said normally rotatable finger toward said last-named part, and a cam-part operatively interposed between said finger and said last-named part, for causing urging of said intermittently rotatable part toward said bearing and thereby frictionally holding said intermittently rotatable part during its positions of rest.

9. In a planter of the character described, the combination of a seed-hopper provided with a seed-opening, a normally stationary element, a normally rotating element arranged for coaction therewith, resilient means for urging said coaction, seed-feeding teeth having connection with said normally stationary element, said seed-feeding teeth coacting with said opening for picking the seed out of said hopper through said opening, and a removable cam-part acting to release said coaction and to brake said normally stationary element.

10. In a planter of the character described, the combination of a seed-hopper having a bottom wall provided with a seed-opening, a normally stationary element provided with seed-feeding teeth coacting with said seed-opening and extending below said seed-opening, a normally rotatable element arranged to coact with said normally stationary element, an element for controlling said coaction, and a shield received at the side of said normally stationary element between said seed-opening and said elements for shielding said elements.

In testimony whereof, I have hereunto signed my name in the presence of two subscribing witnesses.

CHAS. E. FISCHER.

Witnesses:
THERESA M. SILBER,
NATHANIEL H. MAXWELL.

Copies of this patent may be obtained for five cents each, by addressing the "Commissioner of Patents, Washington, D. C."